United States Patent Office 3,089,785
Patented May 14, 1963

3,089,785
PROCESS OF MANUFACTURING
NUCLEAR FUEL
John G. Lewis and Harold A. Ohlgren, Ann Arbor, Mich., assignors, by mesne assignments, to American Metal Products Company, Detroit, Mich., a corporation of Michigan
No Drawing. Filed Mar. 23, 1960, Ser. No. 16,927
9 Claims. (Cl. 117—71)

This invention relates generally to novel nuclear fuel materials and methods for making the same. In one specific embodiment, this invention pertains to a method for producing graphite bodies containing uranium carbides or oxides dispersed therein. In another specific embodiment this invention pertains to methods for providing protective coatings or diffusion barriers on the surface of each of a large number of small particles. In still another embodiment, this invention pertains to a method for providing protective coatings or diffusion barriers on the surface of graphite particles containing finely divided particles of uranium carbide, uranium dioxide and other refractory materials or metals having utility as nuclear reactor fuels.

There is presently a great need for nuclear fuels for nuclear reactors which will permit such reactors to operate at much higher temperatures than is possible with presently available fuels and structures. The operation of nuclear reactors at higher temperatures will permit greatly increased thermodynamic efficiency in much smaller sizes of nuclear reactors. Decreasing the size of a nuclear reactor can in turn result in great reductions in the size and weight of the attendant shielding and containment structures associated therewith.

The idea of producing nuclear fuels by dispersing uranium oxides or carbides in graphite or a similar material is known. However, the uranium carbides or oxides are usually produced by rather complex procedures involving a large number of successive steps wherein a uranium hexafluoride may be hydrolyzed to a uranyl fluoride and the oxide then extracted from the aqueous solution. In addition, the step of uniformly dispersing the uranium oxides (or uranium carbides) throughout the graphite mass often involves difficulties.

Some nuclear reactor designs have called for the use of finely divided fuel and/or blanket materials usually suspended in a fluid medium such as a liquid slurry or agitated, suspended or fluidized in a gas stream. Many such refractory sources or fissionable particles may react chemically under these conditions or may sinter together or to the container under the elevated temperature conditions. This in turn may allow fission products to diffuse out from the particles to the fluid medium surrounding such particles, thereby causing undesirable nuclear characteristics or problems of contamination of other parts of the system with such radioactive materials. In addition, such fuel particles may abrade each other and release very fine dusts to the fluid medium. When this occurs, it disturbs nuclear reactor operation, necessitates recovery of such fines from other parts of the system and represents a potential source of loss of nuclear fuel.

It is, therefore, a primary object of this invention to provide a novel type of nuclear fuel and a method for making the same. Another object of this invention is to provide nuclear fuel materials comprising uniform dispersions of uranium carbides or uranium oxides in graphite masses. Another object of this invention is to provide a simplified procedure for converting uranium hexafluoride to uranium dioxide or uranium carbide. A further object of this invention is to provide novel nuclear fuel containing metal or metal carbide coatings which serve to maintain the structural and chemical integrity of the fuel while causing only small or tolerably adverse effects on its nuclear properties.

In accordance with one embodiment of this invention, solid carbonaceous material is initially introduced into an adsorption zone. The solid carbonaceous material may consist of graphite, charcoal, coal or similar materials, but graphite is preferred because of its various desirable properties. For example, graphite has desirable nuclear properties as a moderator, has temperature resistance, is readily available, is accepted and in use, has high purity and is free from boron and other neutron absorbers. The size of the solid carbonaceous material employed will largely depend upon the particular reactor design which is adopted, the power density requirements, the desired rate of reactor heat transfer, etc. However, by way of example, graphite having a range of sizes between about 20 and 350 mesh size is suitable and a mesh size of about 100 would be preferred. The amount of the solid carbonaceous material is not critical but is generally enough so that only a small proportion of the graphite will react, while at the same time being in a sufficient amount to completely convert the hereinafter mentioned uranium hexafluoride to the tetrafluoride of uranium. An approximate 10 to 1 ratio of graphite to uranium hexafluoride has been found to be quite suitable. Although it is preferred that the solid carbonaceous material be introduced into the adsorption zone as a finely divided particulate material, if desired, the carbonaceous material may be molded or pressed into desire shapes, such as granules, pellets, tablets, etc.

Either simultaneously with the introduction of the solid carbonaceous material into the adsorption zone, or at some later time, gaseous uranium hexafluoride is introduced into the adsorption zone together with an inert diluent gas. The uranium hexafluoride is preferably obtained as the product of a gas diffusion process. The inert diluent gas is preferably a gas such as argon or helium. Diluent gases which would be reactive with either carbon or uranium fluorides under the hereinafter specified reaction conditions would be unsuitable. The total amount of the uranium hexafluoride which is introduced into the adsorption zone is generally only enough so that not more than a small proportion of the carbonaceous material will be converted to uranium carbides. The concentration of the uranium hexafluoride in the inert diluent gas usually only amounts to about from 1 to 10 volume percent based upon the volume of diluent gas. However, greater or smaller amounts might be used if desired. The rate at which the uranium hexafluoride and inert diluent gas are introduced into the adsorption zone is not critical, except that it must be added at a sufficiently fast rate to control pressures within the ranges hereinafter specified and at a slow enough rate to maintain the process in a subcritical condition. The temperature of the uranium hexafluoride and inert gas which are introduced into the adsorption zone is preferably about room temperature and in any event is low enough so that reaction will not occur between the uranium hexafluoride and the carbonaceous material. The pressure within the adsorption zone is preferably at least 1 atmosphere or higher so as to facilitate the diffusion of the uranium hexafluoride into and around the carbonaceous particles.

The time of contacting the uranium hexafluoride and diluent gas with the solid carbonaceous material is not critical to the process and one skilled in the art can readily ascertain how long it takes for the uranium hexafluoride to become thoroughly diffused throughout the carbonaceous material.

The carbonaceous material containing adsorbed gases ($UF_6$ and diluent gases) is next subjected to elevated temperature and pressure conditions in either the same zone or in another zone. The temperature within this zone is preferably greater than about 1,000° C. The temperature should be high enough to give a considerable reaction rate. If the reaction rate appears to be too slow, the temperature can, of course, be raised. However, the reaction rate should be slow enough to allow the carbon tetrafluoride formed during the reaction to escape from the carbonaceous material. The pressure should be sufficiently great to prevent the escape of uranium hexafluoride before all of the uranium hexafluoride has been converted to uranium tetrafluoride, and for example, a pressure of between about 1 and 2 atmospheres absolute is desired. The time is preferably about 1 to 2 hours.

The purpose of the above step is to promote the reaction: $UF_6(g) + \frac{1}{2}C(s) = UF_4(s) + \frac{1}{2}CF_4(g)$.

The carbonaceous material containing dispersed solid $UF_4$ and associated $CF_4$, $UF_6$ and diluent gases is next submitted to even greater temperatures but at reduced pressures and this additional step may be carried out in either the same or a different apparatus than was used for the previous step.

The temperature in this step may be within the broad range of 1500 to 3000° C. and is preferably between about 2000 and 2500° C. The purpose of these elevated temperatures is to promote the reaction represented by the following equation:

$$UF_4(s) + 2C(s) = UC(s) + CF_4(g)$$

The pressure is maintained between about 0.1 and 10,000 microns of mercury absolute and preferably between about 1 and 10 microns of mercury absolute. Actually, there is no lower limit to the pressure which could be suitably used, except those practical limitations imposed by available apparatus. The purpose of the reduced pressure is to remove the gaseous $CF_4$ which is formed so that the above reaction will progress satisfactorily toward the right. The time for this step may suitably encompass several hours. The gases which are removed as a result of the reduced pressure include $CF_4$ as a gas together with any of the residual or diluent gases.

The resulting material from the last step mentioned above comprises a carbonaceous material, preferably graphite, containing dispersed therethrough uranium carbides. These products are useful in the nuclear reactor fields as fuels.

When the above mentioned product contains a mixture of carbides, such as both uranium monocarbides and uranium dicarbides, it is possible to convert all of the dicarbides to monocarbides by suitable heat treatment at elevated temperatures in a non-oxidizing atmosphere. Also, in the event that uranium in the form of its oxides is preferred rather than uranium carbides, the uranium carbides may be converted to uranium oxides by a suitable oxidation treatment, which would also produce carbon monoxide and/or carbon dioxide as by-products. Uranium oxides may be converted to the dioxides by reduction of any higher oxides with hydrogen.

The above process, therefore, represents a simplified means for converting uranium hexafluoride to compounds of uranium. This process avoids the present need of first reducing uranium to the metal or to other compounds before forming the uranium carbide(s). This process also permits the dispersion of uranium carbide throughout a graphite structure inasmuch as the uranium is introduced into the graphite in gaseous form. This procedure eliminates the need to form uranium carbide separately and to thereafter attempt to uniformly dispose the uranium carbide throughout a graphite mass.

However, although the products of the above process possess great utility it has sometimes been found that they suffer from some minor disadvantages. For example, it has been found that graphites containing dispersed uranium carbides or uranium oxides are subject to spalling, abrasion, fission product release, diffusion of fuel materials, sintering of particles, contamination of working fluids, etc. In order to overcome some of these disadvantages, it has been conceived that the surfaces of graphite particles or shapes containing the dispersed uranium carbides or oxides could be provided with a protective coating or diffusion barrier.

The following description sets forth some procedures which we have devised for effecting this coating operation.

One coating procedure involved introduction of the particles (i.e., particles of graphite containing dispersed uranium carbides) into a fluidizing zone so that the particles were maintained as a fluidized bed. The fluidizing medium was a gaseous mixture. A metal halide in vapor form was injected into the fluidized bed under elevated temperature conditions and at the same time a reducing gas was also introduced into the fluidized bed. The action of the reducing gas in the presence of the metal halide caused the deposition of metal on the fluidized particles, and introduction of both the reducing gas and the metal halide was continued until the desired thickness of metal had been deposited on the particles. The particles were periodically removed and inspected in order to ascertain whether there was a coating of sufficient thickness. A thickness of 10–50 mils will be found suitable in most cases. Chlorides of tantalum, niobium, molybdenum, tungsten, zirconium and titanium were tried and found to be satisfactory in conjunction with hydrogen as a reducing gas.

It was found that the metallic coatings deposited in the above described manner could be converted to the carbides by heating in the presence of a hydrocarbon gas such as methane, propane, etc. Carburization with a hydrogen gas can be made to take place either simultaneously with or subsequent to the metal coating operation. Any hydrogen chloride formed as a result of the reaction between hydrogen and the metal chloride can be withdrawn either periodically or continuously and with either chemical or physical means. Carburizing the metallized surfaces can either take place in the same or a different container, preferably also fluidized.

If desired, a plurality of different metal coatings may be deposited on the fluidized bodies by using different metal halides in successive steps. Also, if one desires, additional metal coatings could be applied subsequent to the carburization step, either using the same or a different metal.

Another coating procedure which we devised involved introducing the particles to be coated into an evacuated (1–100 microns) coating region, into which was simultaneously introduced vapors of metals and/or other materials. The vaporized metal (such as tantalum, niobium, molybdenum, tungsten, zirconium, titanium, thorium, etc.) condensed on the particles in the evacuated chamber. This metallic coating could be carburized as noted above with respect to the fluidized techniques or carbon vapor (e.g. from electrodes) could be introduced into the evacuated region at an appropriate temperature and the carbon vapor and metallic vapor or metallic surface of the particles would react to form metal carbides. Suitable equipment for accomplishing the deposition of metal, carbon and/or carbide would include vacuum (1–100 microns) arc furnaces wherein the temperature in the arc was 6000–7000° F. and the temperature outside the arc was within the range of 500–1000° F. and wherein the particles to be coated are passed quickly through or near an arc struck between electrodes, one or more of which may be made of the desired coating materials, and speeds sufficiently slow to allow some condensation of electrode materials on each pass but not at speeds so slow that sintering or fusion of the particles occur. When coating with tantalum by the arc process the temperature is preferably maintained at about 6000–6500° F. and with zirconium at about 5000–5500° F.

In an evacuated coating zone the particles to be coated could be given the desired impetus or acceleration by imposing an electromagnetic field at spaced intervals to cause small steel balls in a cool portion of the furnace to shoot the particles around a semi-circular race track near the arc. The particles could be sent near or through the arc as many times as desired in order to achieve proper surface treatment.

This invention permits the use of a finely divided source of fissionable nuclear fuels, thus promoting good heat transfer to working fluids in a nuclear reactor. Coated fuel particles minimize or eliminate abrasion, spalling, fission product release, diffusion of fuel materials, sintering of particles together or to the structural parts of the reactor, or contamination of the working fluid.

In conclusion, while we have illustrated and described some preferred embodiments of our invention, it is to be understood that since the various details of construction may obviously be varied considerably without really departing from the basic principles and teachings of the invention, we do not limit ourselves to the precise constructions herein disclosed and the right is specifically reserved to encompass all changes and modifications coming within the scope of the invention as defined in the appended claims. Having thus described our invention, what we claim as new and desire to secure United States Letters Patent for is:

1. The process which comprises,
   (a) contacting a finely divided solid carbonaceous material with gaseous uranium hexafluoride,
   (b) causing the uranium hexafluoride to thoroughly diffuse through the carbonaceous material,
   (c) causing the uranium hexafluoride to react with the solid carbonaceous material, thus resulting in the formation of solid uranium tetrafluoride and gaseous carbon tetrafluoride,
   (d) thereafter heating the carbonaceous material containing dispersed solid uranium tetrafluoride so as to cause the solid uranium tetrafluoride to react with the carbonaceous material to thereby form uranium carbide and further amounts of carbon tetrafluorides, and
   (e) recovering a predominantly carbonaceous product having uranium carbides dispersed therein.

2. The process according to claim 1 wherein said carbonaceous material is graphite.

3. The process according to claim 1 wherein the predominantly carbonaceous product having uranium carbides dispersed therein is subsequently given an oxidation treatment so as to convert at least a portion of the uranium carbides to uranium oxides.

4. The process according to claim 1 wherein said carbonaceous product is subsequently coated in a separate step with a surface layer of metallic material.

5. The process of claim 4 wherein said metallic layer comprises a metal selected from the group consisting of tantalum, niobium, molybdenum, tungsten, zirconium, titanium and thorium.

6. The process according to claim 5 wherein said coating step is effected by fluidizing the carbonaceous products in a fluidization zone and introducing a metallic chloride and a reducing gas into said fluidization under elevated temperature conditions whereby a coating of metal is deposited on said carbonaceous product.

7. The process according to claim 5 wherein said carbonaceous product is coated by passing it through a high temperature arc wherein contact with metal vapors is effected.

8. The process according to claim 6 wherein carburization of the metal coating is effected by introducing the said carbonaceous material containing a metallic coating into a carburization zone.

9. In a process for manufacturing nuclear fuel, the steps comprising
   (a) introducing a particlized solid carbonaceous material into an adsorption zone,
   (b) introducing gaseous uranium hexafluoride into said adsorption zone so that it is diffused through the carbonaceous material,
   (c) maintaining the temperature in said zone sufficiently low so that reaction will not occur between the uranium hexafluoride and the carbonaceous material during introduction into said zone,
   (d) subjecting the carbonaceous material with the adsorbed uranium hexafluoride therein to elevated temperatures sufficient to cause the uranium hexafluoride to react with the solid carbonaceous material to form solid uranium tetrafluoride,
   (e) subjecting said carbonaceous material with the dispersed uranium tetrafluoride therein to further elevated temperatures sufficient to cause the solid uranium tetrafluoride to react with the carbonaceous material to thereby form uranium carbide and further amounts of carbon tetrafluorides, and
   (f) recovering said carbonaceous material with the uranium carbide dispersed therein.

References Cited in the file of this patent

UNITED STATES PATENTS

| 2,743,196 | Robinson | Apr. 24, 1956 |
| 2,835,608 | Kanter | May 20, 1958 |
| 2,910,379 | Gurinsky | Oct. 27, 1959 |
| 2,920,024 | Barton et al. | Jan. 5, 1960 |
| 2,990,351 | Sanz et al. | June 27, 1961 |

FOREIGN PATENTS

| 203,560 | Australia | Aug. 11, 1955 |

OTHER REFERENCES

Powel et al., "Vapor Plating," p. 71, John Wiley and Sons, Inc., New York (1955).

Wisnyi, "Ceramics in Nuclear Reactors," Ceramics Industry, pp. 57–58, February 1960.

Blocher et al., "Carbide Coatings on Graphite," Battelle Memorial Institute, Report No. BMI-1200, p. 29.

UNITED STATES PATENT OFFICE
CERTIFICATE OF CORRECTION

Patent No. 3,089,785 May 14, 1963

John G. Lewis et al.

It is hereby certified that error appears in the above numbered patent requiring correction and that the said Letters Patent should read as corrected below.

Column 4, line 34, for "hydrogen" read -- hydrocarbon --.

Signed and sealed this 12th day of May 1964.

(SEAL)
Attest:

ERNEST W. SWIDER
Attesting Officer

EDWARD J. BRENNER
Commissioner of Patents